United States Patent
Mouri et al.

(10) Patent No.: US 7,065,029 B2
(45) Date of Patent: Jun. 20, 2006

(54) SIGNAL PROCESSOR

(75) Inventors: Hiroki Mouri, Osaka (JP); Kouichi Nagano, Osaka (JP); Akira Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 468 days.

(21) Appl. No.: 10/170,581

(22) Filed: Jun. 14, 2002

(65) Prior Publication Data

US 2003/0002418 A1 Jan. 2, 2003

(30) Foreign Application Priority Data

Jul. 2, 2001 (JP) ........................................ 2001-200972

(51) Int. Cl.
*G11B 7/00* (2006.01)

(52) U.S. Cl. ...................................... 369/59.22; 369/46

(58) Field of Classification Search .............. 369/59.22, 369/13; 360/46, 65; 375/341
See application file for complete search history.

(56) References Cited

U.S. PATENT DOCUMENTS 5,488,591 A * 1/1996 Kobayashi et al. ......... 369/13.02
5,563,864 A 10/1996 Kobayashi et al.
5,675,569 A 10/1997 Yamaguchi et al.
6,246,731 B1 * 6/2001 Brianti et al. ............... 375/341
6,834,035 B1 * 12/2004 Marukawa et al. ......... 369/59.22

FOREIGN PATENT DOCUMENTS

JP 09-306109 11/1997

OTHER PUBLICATIONS

English translation (translated by machine) of JP 09-306109.*
Kabal, Peter., et al. "Partial–Response Signaling." IEEE Transactions on Communications, vol. COM–23, No. 9, pp. 921–934, Sep. 1975.
"Perpendicular Recording has Achieved 52.5 Gbit/(inch)$^2$", Nikkei Electronics, Sep. 25, 2000, No. 779, pp. 204–211.

* cited by examiner

*Primary Examiner*—W. R. Young
*Assistant Examiner*—Lixi Chow
(74) *Attorney, Agent, or Firm*—McDermott Will & Emery LLP

(57) ABSTRACT

A waveform equalizer, which has a partial response characteristic represented in the form of PR (a, b, c, b, a) which is a quaternary transfer function characteristic, is made up an analog filter, an ADC (analog/digital converter), and an FIR filter, for providing matching with the frequency characteristic of a read back waveform read from a recording medium. Such signal processor characteristic approximation to the regenerative signal characteristic makes it possible to easily achieve equalization without particularly emphasizing the regenerative signal, thereby achieving a reduced circuit scale.

1 Claim, 2 Drawing Sheets

SIGNAL PROCESSOR

BACKGROUND OF THE INVENTION

The present invention relates to a signal processor suitable for the processing of a read back waveform read from a recording medium such as for example an optical disc and a magnetic disc.

Removable, high-density optical discs such as CD-R/W (Compact Disc Re-Writable) and DVD (Digital Versatile Disc) have been utilized extensively in recent years, and their recording density has become higher and higher from year to year. On the other hand, in the field of magnetic disc technology, perpendicular magnetic recording has lately attracted attention, and it has been reported that an areal recording density as high as 100 Gbit/(inch)$^2$ is realized (NIKKEI ELECTRONICS, 25 Sep. 2000, No. 779, pp. 204–211).

With a view to regenerating information high-density recorded on a recording medium without error, to date various signal processing methods have been examined. Such methods include PRML (Partial Response Maximum Likelihood), DFE (Decision Feedback Equalizer), TCPR (Trellis Coding Partial Response) and so forth, and for example these methods have been employed in signal processing LSIs for hard disk apparatus.

PRML employs a partial response (PR) method and the Viterbi decoding technique which is a maximum likelihood (ML) decoding technique. The partial response method is a signal processing method capable of performing data regeneration by positively making utilization of inter symbol interferences, i.e. interference between adjacent data or interference between read back waveforms. On the other hand, the Viterbi decoding technique, which is also called a maximum likelihood data series estimation method, is a method capable of regenerating a most reliable data series in time series by making use of previous data.

Conventionally, signal processors having a partial response characteristic which is represented in the form of PR (a, b, b, a) which is a tertiary transfer function characteristic, have been used. More specifically, PR (3, 4, 4, 3)-characteristic signal processors have been used in the past. However, this PR (3, 4, 4, 3) characteristic cannot be said to provide matching with the frequency characteristic of a read back waveform read from a recording medium.

SUMMARY OF THE INVENTION

Accordingly, an object of the present invention is to improve the performance of a signal processor for use in information readout from a recording medium.

In order to achieve the object, the present invention provides a signal processor having a partial response characteristic which is represented in the form of PR (a, b, c, b, a) which is a quaternary transfer function characteristic, for providing matching with the frequency characteristic of a read back waveform read from a recording medium. Such signal processor characteristic approximation to the regenerative signal characteristic makes it possible to achieve equalization without particularly emphasizing the regenerative signal, thereby providing a signal processor of reduced circuit scale.

DETAILED DESCRIPTION OF THE INVENTION

Figure 1:
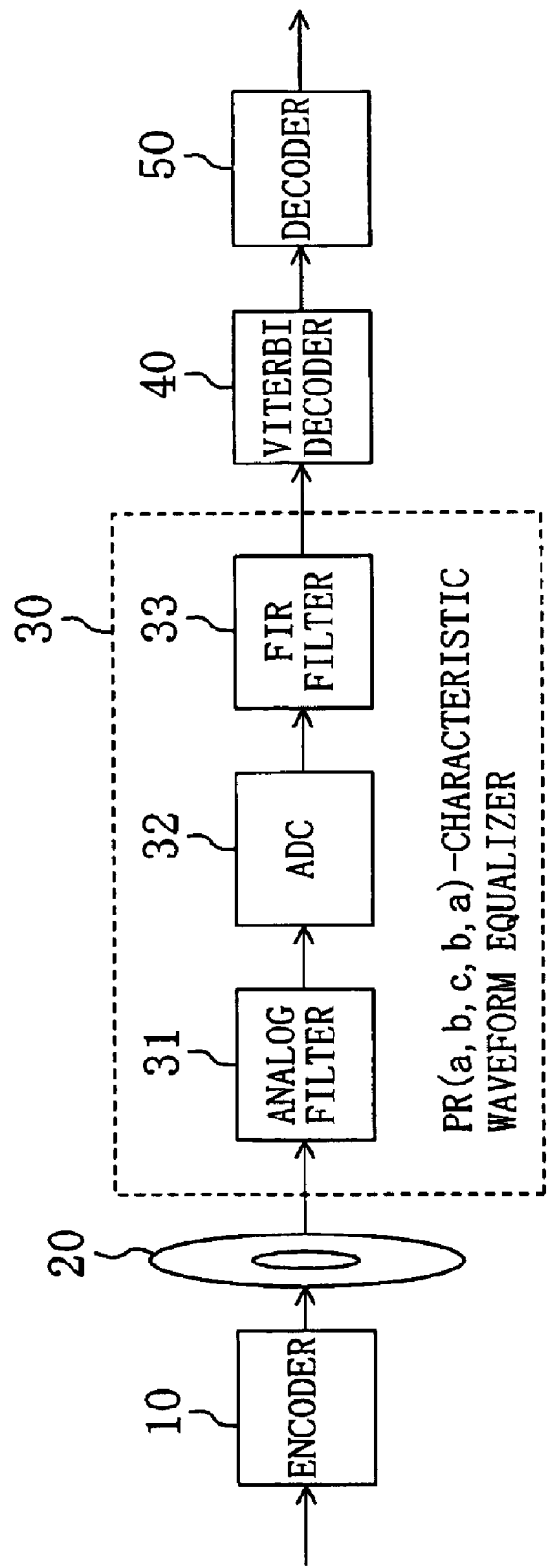
FIG. 1 is a block diagram showing a data flow in an optical disc record regenerating apparatus employing a signal processor as an embodiment of the present invention.

Referring first to FIG. 1, there is shown a data flow in an optical disc record regenerating apparatus employing a signal processor according to an embodiment of the present invention. FIG. 1 shows: an encoder 10 as a record modulator; an optical disc 20 as a recording medium; a waveform equalizer 30 having a PR (a, b, c, b, a) characteristic which is a quaternary transfer function characteristic; a Viterbi decoder 40 as a maximum likelihood decoder; and a decoder 50 as a record demodulator. The waveform equalizer 30 comprises an analog filter 31, an ADC (analog/digital converter) 32, and an FIR filter 33.

As seen in FIG. 1, an analog regenerative signal read from the optical disc 20 is fed to the analog filter 31 where noise content of the regenerative signal added during regeneration processing is removed. And, the analog signal with noise-removed waveforms is converted by the ADC 32 into a digital signal. The digital signal thus converted is subjected to a waveform equalizing process based on the adaptive equalization function in the FIR filter 33, and error correcting is carried out in the Viterbi decoder 40. The data, which has undergone such error correction, is fed to the decoder 50 and is output as user data.

Figure 2:
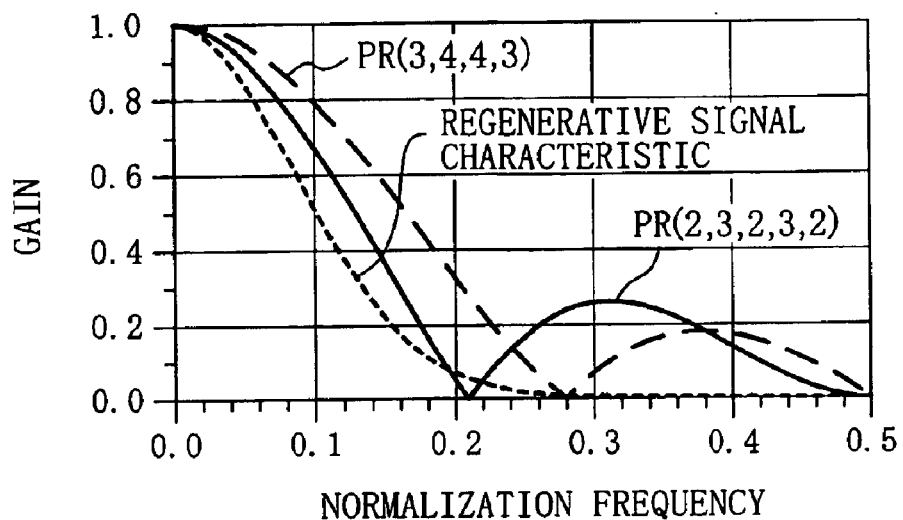
FIG. 2 is a frequency characteristic diagram contrasting the conventional PR (3, 4, 4, 3) characteristic and the present invention's PR (2, 3, 2, 3, 2) characteristic with the optical disc's regenerative signal characteristic.

FIG. 2 contrasts the conventional PR (3, 4, 4, 3) characteristic and the present invention's PR (2, 3, 2, 3, 2) characteristic with the optical disc's regenerative signal characteristic. Here, the relationship between the parameters a, b, and c is: a=c<b, and the PR (a, b, c, b, a) characteristic is represented in the form of PR (2, 3, 2, 3, 2). FIG. 2 clearly shows that, in terms of frequency characteristic matching property, the PR (2, 3, 2, 3, 2) characteristic is closer to the regenerative signal characteristic in comparison with the PR (3, 4, 4, 3) characteristic.

Figure 3:
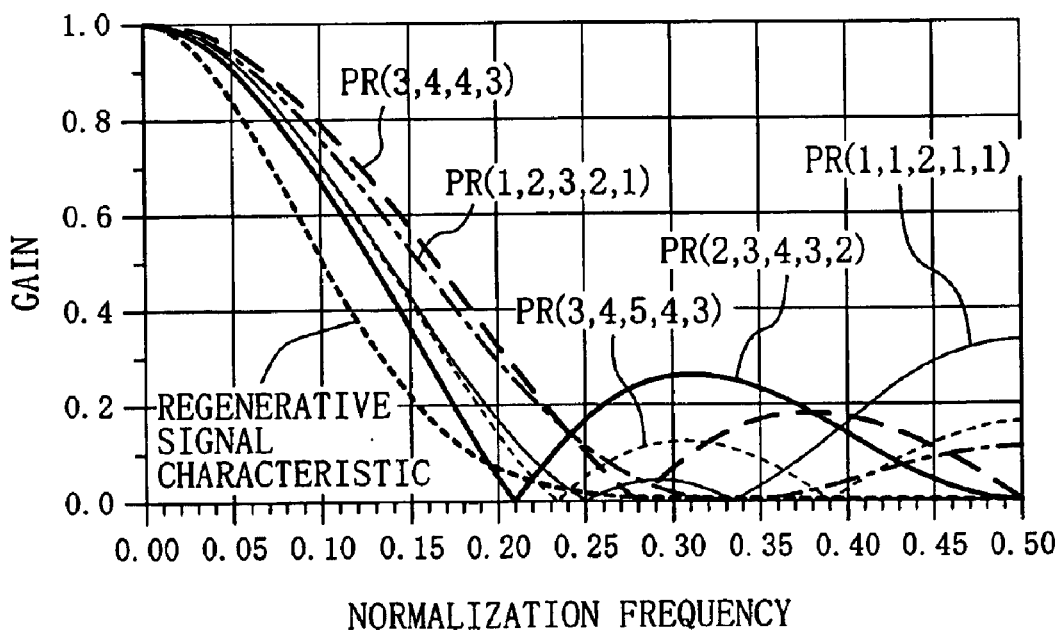
FIG. 3 is a frequency characteristic diagram contrasting the conventional PR (3, 4, 4, 3) characteristic and the present invention's PR characteristics, namely (2, 3, 4, 3, 2), (3, 4, 5, 4, 3), (1, 2, 3, 2, 1), and (1, 1, 2, 1, 1), with the optical disc's regenerative signal characteristic.

FIG. 3 contrasts the conventional PR (3, 4, 4, 3) characteristic, and the present invention's PR characteristics, namely (2, 3, 4, 3, 2), (3, 4, 5, 4, 3), (1, 2, 3, 2, 1), and (1, 1, 2, 1, 1), with the optical disc's regenerative signal characteristic. Here, the relationship between the parameters a, b, and c is: a≦b<c, and the PR (a, b, c, b, a) is represented in the form of any one of the PR (2, 3, 4, 3, 2), (3, 4, 5, 4, 3), (1, 2, 3, 2, 1), and (1, 1, 2, 1, 1) characteristics. FIG. 3 clearly shows that, in terms of frequency characteristic matching property, any of the PR (2, 3, 4, 3, 2), (3, 4, 5, 4, 3), (1, 2, 3, 2, 1), and (1, 1, 2, 1, 1) characteristics is closer to the regenerative signal characteristic in comparison with the PR (3, 4, 4, 3) characteristic.

What is claimed is:

1. A waveform equalizer comprising an analog filter, an ADC, and a FIR filter, said waveform equalizer having a partial response characteristic represented in the form of PR (a, b, c, b, a) which is a quaternary transfer function characteristic, for providing matching with the frequency characteristic of a read back waveform read from a recording medium, wherein said (a, b, c, b, a) is either one of (2, 3, 2, 3, 2), (2, 3, 4, 3, 2), (3, 4, 5, 4, 3), and (1, 1, 2, 1, 1).

* * * * *